US012561703B2

(12) United States Patent
Ravindranath et al.

(10) Patent No.: US 12,561,703 B2
(45) Date of Patent: Feb. 24, 2026

(54) SYSTEM AND METHOD FOR PERSONA GENERATION

(71) Applicant: Verizon Patent and Licensing Inc., Basking Ridge, NJ (US)

(72) Inventors: Vaishali Ravindranath, Tamilnadu (IN); Kushal Singla, Karnataka (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 39 days.

(21) Appl. No.: 17/706,397

(22) Filed: Mar. 28, 2022

(65) Prior Publication Data

US 2023/0306448 A1 Sep. 28, 2023

(51) Int. Cl.
G06Q 30/02 (2023.01)
G06Q 30/0201 (2023.01)

(52) U.S. Cl.
CPC .............................. G06Q 30/0201 (2013.01)

(58) Field of Classification Search
CPC ...................................................... G06Q 30/02
See application file for complete search history.

(56) References Cited

U.S. PATENT DOCUMENTS

| | | | |
|---|---|---|---|
| 9,519,936 B2 * | 12/2016 | Vijayaraghavan | ........................... G06Q 10/0637 |
| 9,691,082 B1 * | 6/2017 | Burnett | .............. G06Q 30/0255 |
| 10,643,246 B1 * | 5/2020 | Suprasadachandran Pillai | ........... G06Q 30/0269 |
| 2016/0342911 A1 * | 11/2016 | Kannan | .............. G06Q 10/0631 |
| 2017/0083916 A1 * | 3/2017 | Fadli | .................. G06Q 20/4014 |

| | | | |
|---|---|---|---|
| 2017/0270416 A1 * | 9/2017 | Sri | ......................... G06Q 10/04 |
| 2018/0060902 A1 * | 3/2018 | Allouche | ........... G06Q 10/0639 |
| 2019/0251593 A1 * | 8/2019 | Allouche | ........... G06Q 10/0639 |
| 2019/0260879 A1 * | 8/2019 | Raleigh | ................. H04M 15/83 |
| 2019/0372857 A1 * | 12/2019 | Gandhi | ............... H04L 41/0896 |
| 2020/0349629 A1 * | 11/2020 | Parush Tzur | ......... H04L 67/306 |
| 2023/0037997 A1 * | 2/2023 | Vagelos | ................ H04W 48/16 |

FOREIGN PATENT DOCUMENTS

| | | | | |
|---|---|---|---|---|
| WO | WO-2010129939 A1 * | 11/2010 | ........ | H04M 1/72463 |
| WO | WO-2016187437 A1 * | 11/2016 | ......... | G06Q 10/0631 |

OTHER PUBLICATIONS

Nan Tu et al., Using Cluster Analysis in Persona Development, Research Center for Modern Logistics, Department of Industrial Engineering, Research Gate, Jan. 13, 2014. (Year: 2014).*

* cited by examiner

*Primary Examiner* — Kurtis Gills

(57) ABSTRACT

One or more computing devices, systems, and/or methods are provided. In an example, a method comprises receiving, by a device, attribute data for a customer, determining, by the device, a cluster label for the customer based on the attribute data, determining, by the device, a first customer persona for the customer using a decision tree classifier model based on the cluster label and the attribute data, and providing, by the device, targeted content based on the first customer persona. Embodiments described herein also include a system comprising a processor configured to execute instructions to facilitate performance of operations comprising receiving attribute data for a customer, determining a cluster label for the customer based on the attribute data, determining a first customer persona for the customer using a decision tree classifier model based on the cluster label and the attribute data, and providing targeted content based on first customer persona.

20 Claims, 9 Drawing Sheets

200

300

RECEIVE INCOMING ATTRIBUTE DATA — 302

CLUSTER MODEL — 109

DETERMINE CLUSTER LABEL USING CLUSTER MODEL — 304

PERSONA CLASSIFER MODEL — 112

DETERMINE CANDIDATE CUSTOMER PERSONAS USING CLASSIFICATION MODEL — 306

RANK CANDIDATE CUSTOMER PERSONAS — 308

SELECT PERSONA FROM CANDIDATE CUSTOMER PERSONAS — 310

PROVIDE TARGETED CONTENT BASED ON SELECTED CUSTOMER PERSONA — 312

SYSTEM AND METHOD FOR PERSONA GENERATION

BACKGROUND

Service providers interact with existing and potential customers to provide different services and products. In a customer-centric business, providing personalized experience to the customers is useful in offering new opportunities, improving customer satisfaction. etc.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
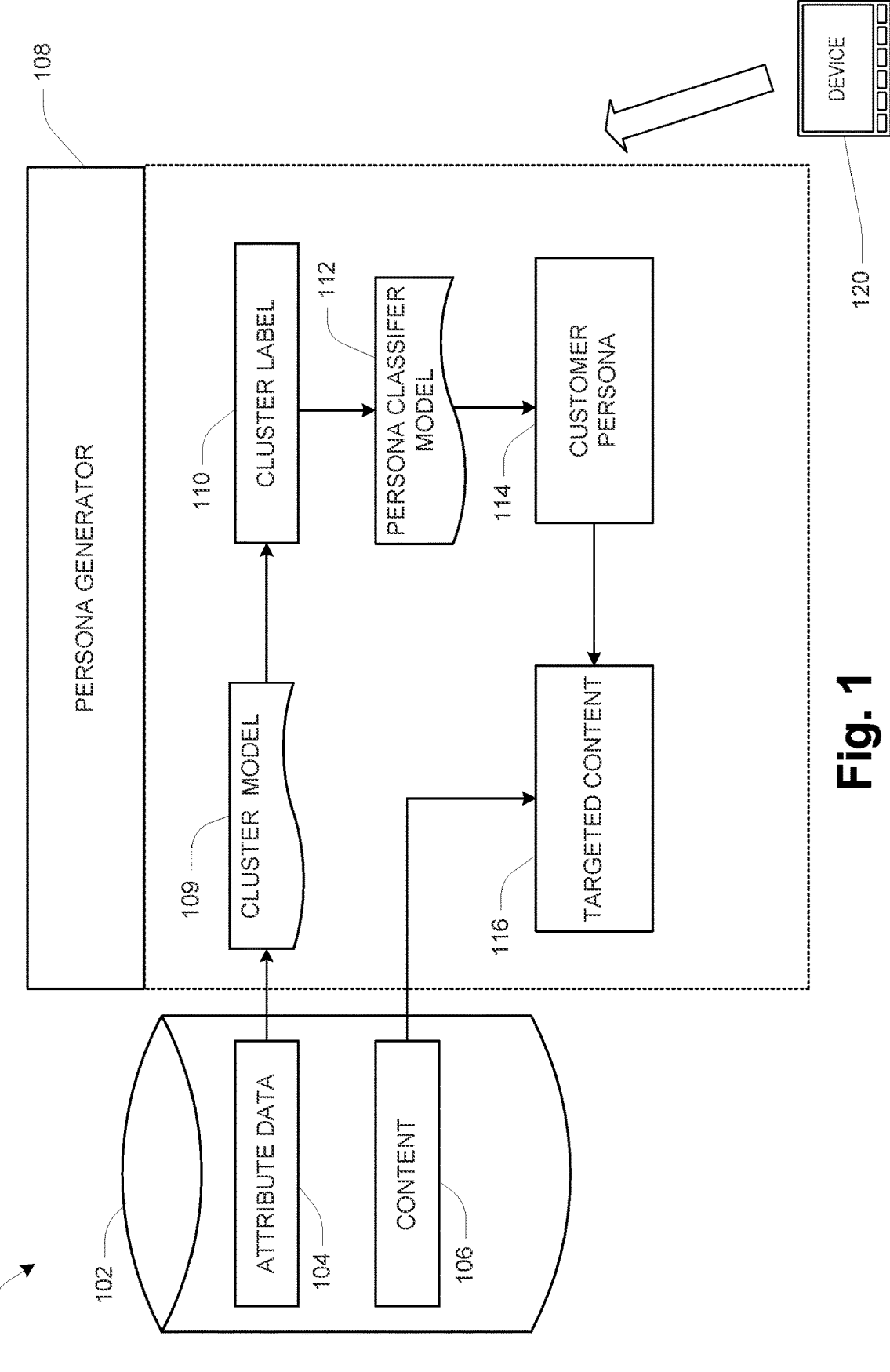
FIG. 1 is a diagram illustrating an example system for persona generation.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for persona generation are provided. To identify the needs of the customer and provide targeted content such as targeted information or targeted service parameters, such as bandwidth, priority, network type (e.g., 5G Nationwide or 5G Ultra-wideband), coverage plan or some other service parameters, customers are grouped into clusters. Individuals in clusters may be targeted with specific content identified as being relevant to that cluster. Persona generation using descriptive labelling aids in identifying the effective segment for content targeting. In some embodiments, cluster labels are generated using K-means clustering. A decision tree classifier model is trained on cluster labels. A persona may be identified for a particular customer by parsing the decision tree classifier, and content for the customer is targeted based on the identified persona.

Embodiments described herein include a method that comprises receiving, by a device, attribute data for a customer, determining, by the device, a cluster label for the customer based on the attribute data, determining, by the device, a first customer persona for the customer using a decision tree classifier model based on the cluster label and the attribute data, and providing, by the device, targeted content based on the first customer persona.

In a further aspect of the method, the first customer persona comprises a first range of values for a first attribute of the attribute data and a second range of values for a second attribute of the attribute data.

In a further aspect of the method, determining, by the device, the cluster label comprises determining the cluster label using a cluster model.

In a further aspect of the method, determining, by the device, the cluster label using the cluster model comprises determining the cluster label using a k-means cluster model.

In a further aspect of the method, providing, by the device, targeted content comprises providing a targeted service parameter.

In a further aspect of the method, determining, by the device, the first customer persona comprises identifying, by the device, a first candidate customer persona and a second candidate customer persona, determining, by the device, a first score for the first candidate customer persona and a second score for the second candidate customer persona, and selecting, by the device, the first candidate customer persona as the first customer persona responsive to the first score being greater than the second score.

In a further aspect of the method, determining, by the device, the first score comprises determining the first score based on a diversity parameter associated with the first candidate customer persona.

In a further aspect of the method, determining, by the device, the first score comprises determining the first score based on a size parameter associated with the first candidate customer persona.

Further aspects of the method comprise selecting, by the device, a second customer persona from the first candidate customer persona and the second candidate customer persona, providing, by the device, the targeted content based on first customer persona and the second customer persona, and sorting, by the device, the targeted content based on the first score and the second score such that a portion of the targeted content associated with the first customer persona is provided prior to a second portion of the targeted content associated with the second persona responsive to the first score being greater than the second score.

Embodiments described herein include a system comprising means for receiving, by a device, attribute data for a customer, means for determining, by the device, a cluster label for the customer based on the attribute data, means for determining, by the device, a first customer persona for the customer using a decision tree classifier model based on the cluster label and the attribute data, and means for providing, by the device, targeted content based on the first customer persona.

Embodiments described herein also include a system comprising a processor configured to execute instructions to facilitate performance of operations comprising receiving attribute data for a customer, determining a cluster label for the customer based on the attribute data, determining a first customer persona for the customer using a decision tree classifier model based on the cluster label and the attribute data, and providing targeted content based on first customer persona.

In a further aspect of the system, the first customer persona comprises a first range of values for a first attribute of the attribute data and a second range of values for a second attribute of the attribute data.

In a further aspect of the system, the operations comprise determining the cluster label using a cluster model.

In a further aspect of the system, the operations comprise determining the cluster label using a k-means cluster model.

In a further aspect of the system, the targeted content comprises a targeted service parameter.

In a further aspect of the system, the operations comprise determining the first customer persona by identifying a first candidate customer persona and a second candidate customer persona, determining a first score for the first candidate customer persona and a second score for the second candidate customer persona. and selecting the first candidate customer persona as the first customer persona responsive to the first score being greater than the second score.

In a further aspect of the system, the operations comprise determining the first score based on a diversity parameter associated with the first candidate customer persona.

In a further aspect of the system, the operations comprise determining the first score based on a size parameter associated with the first candidate customer persona.

In a further aspect of the system, the operations comprise selecting a second customer persona from the first candidate customer persona and the second candidate customer persona, providing the targeted content based on first customer persona and the second customer persona, and sorting the targeted content based on the score of the first customer persona and the score of the second customer persona such that a portion of the targeted content associated with the first customer persona is provided prior to a second portion of the targeted content associated with the second persona responsive to the first score being greater than the second score.

Embodiments described herein also include a non-transitory computer-readable medium storing instructions thereon that when executed facilitate performance of operations comprising receiving attribute data for a customer, determining a cluster label for the customer based on the attribute data, determining a first customer persona for the customer using a decision tree classifier model based on the cluster label and the attribute data, and providing targeted content based on first customer persona.

In a further aspect of the non-transitory computer-readable medium, the operations comprise determining the first customer persona by identifying a first candidate customer persona and a second candidate customer persona, determining a first score for the first candidate customer persona and a second score for the second candidate customer persona, and selecting the first candidate customer persona as the first customer persona responsive to the first score being greater than the second score.

Figure 2:
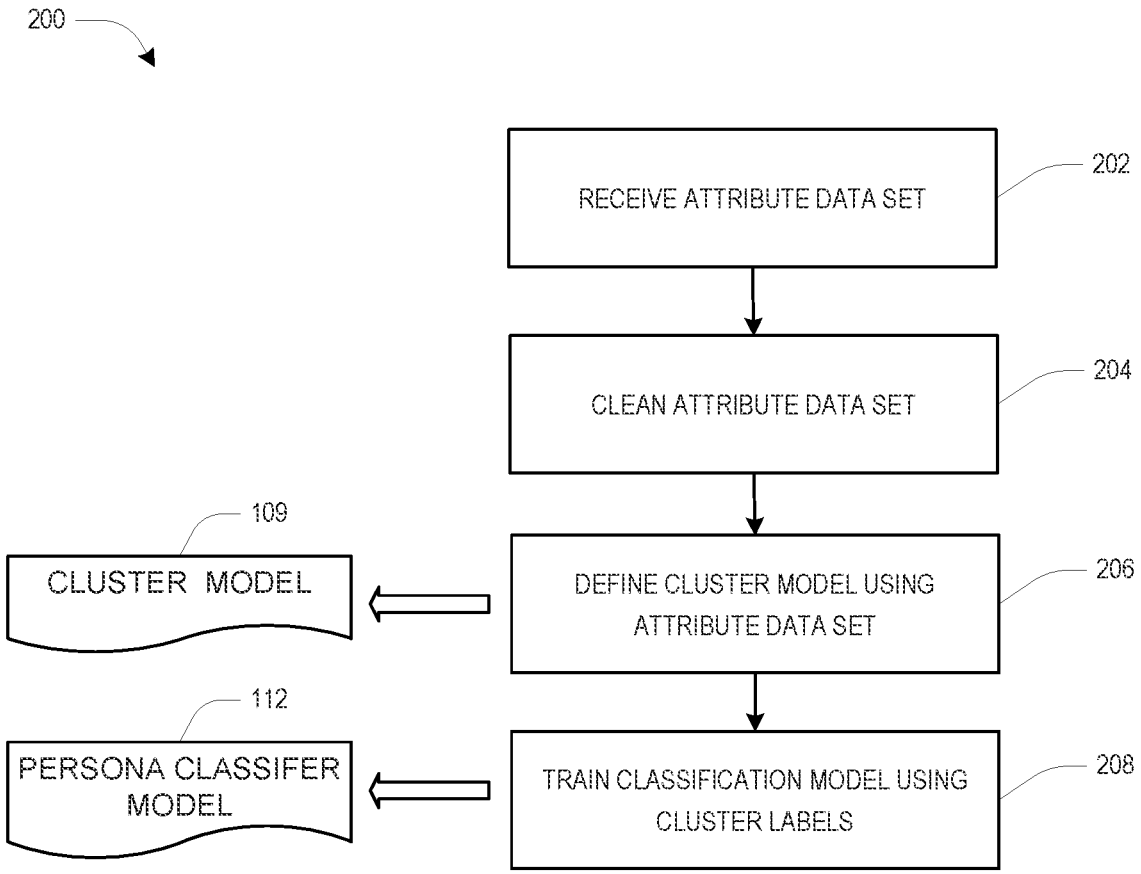
FIG. 2 is a flow chart illustrating an example method for training persona generation models.
Figure 3:
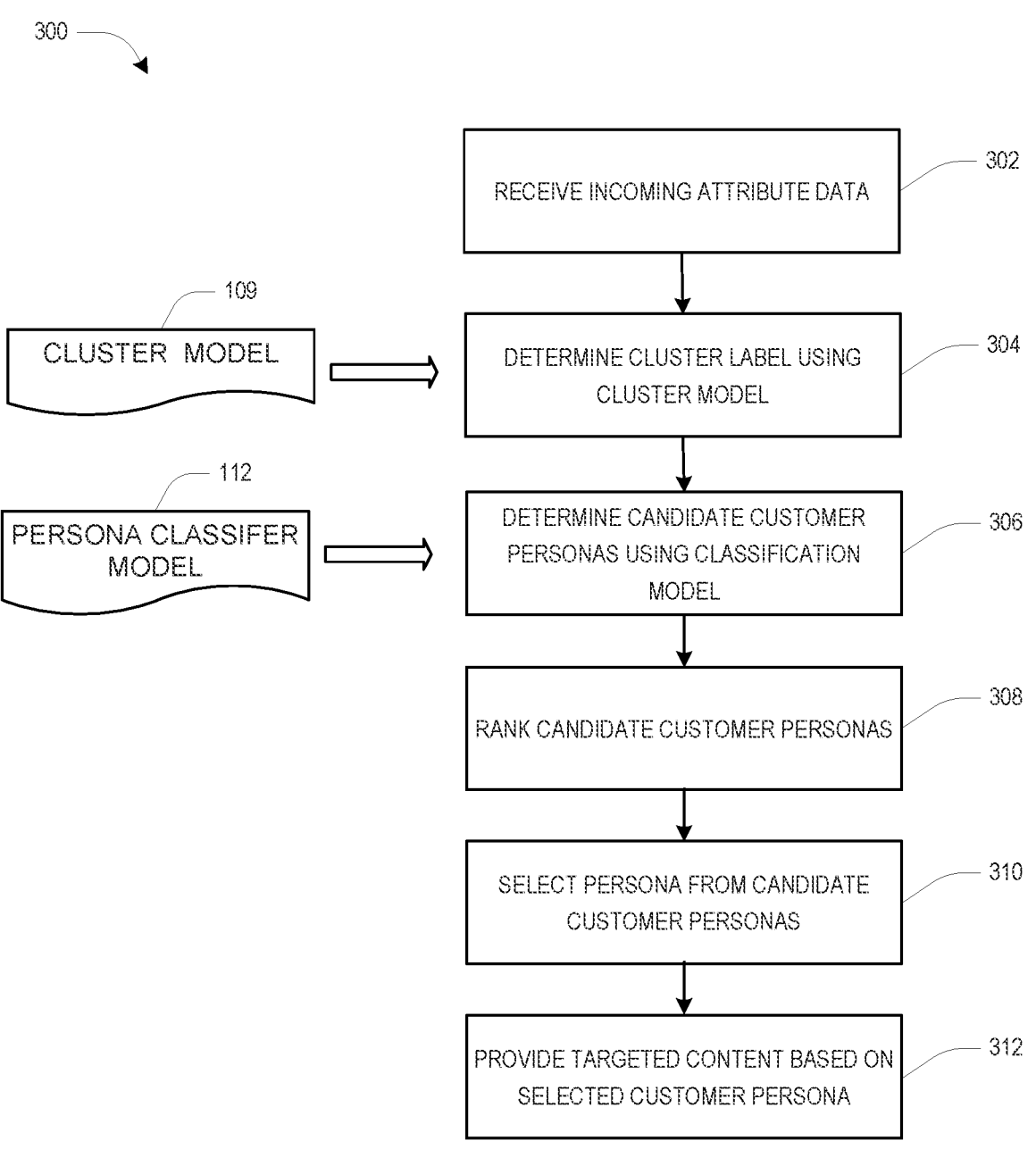
FIG. 3 is a flow chart illustrating an example method for content targeting using a persona.

FIG. 1 is a diagram illustrating an example system 101 for persona generation. FIG. 2 is a flow chart illustrating an example method for training persona generation models. FIG. 3 is a flow chart illustrating an example method for content targeting using a persona. In some embodiments, the example methods 200, 300 are implemented by the example system 101.

Referring to FIG. 1, a database 102 stores information for persona generation and targeting. In some embodiments, the database 102 stores attribute data 104 and content 106. In some embodiments, the attribute data 104 includes information about customers, such as numerical or categorical data. Example numeric data includes customer ID, age, years of work experience, family size, location, or other suitable numerical attribute data. Example categorical attribute data includes gender (male or female), marital status (single, married, previously married), degree status (none, high school, college), profession, spending level (low, medium, high), or other suitable categorical attributes. In some embodiments, the location data is dynamically correlated to attributes of the radio access network (RAN) associated with the location, such as signal strength, sector count, utilization, congestion, or some other RAN attribute.

A persona generator 108 uses the attribute data 104 and a cluster model 109 to generate a cluster label 110. In some embodiments, the cluster model 109 comprises a k-means model that defines clusters of attributes. For example, given a set of observations, where each observation includes d attributes, the cluster model 109 partitions the observations into k clusters. For example, the observations are customer records, and the attributes are customer attributes. In some embodiments, using a k-means approach, the clusters are selected to minimize the variation between the attributes and the attribute means within each cluster. Each cluster has a label. In some embodiments, the persona generator 108 trains the cluster model 109 using a large set of customer observations, each customer observation including the attribute data 104 for a particular customer. To use the cluster model 109 for an incoming customer, the persona generator 108 provides the attribute data 104 for the incoming customer as inputs to the cluster model 109 and the cluster model 109 outputs the cluster label 110.

In some embodiments, the persona generator 108 is implemented in a device 120, such as such as a computing device, a portable media player (e.g., an electronic text reader, an audio device, a portable gaming device, an exercise device, or a navigation device); a portable communication device (e.g., a camera, a phone, a wearable or a text chatting device); a workstation; a server; a cloud computing device; and/or a laptop form factor computer.

The persona generator 108 uses the cluster label 110 as an input to a persona classifier model 112 to generate a customer persona 114 for the incoming customer. In some embodiments, the persona classifier model 112 comprises a decision tree classifier model. The persona classifier model 112 employs a tree structure with decision nodes and leaf nodes. A decision node has two or more branches differentiated by a value of an attribute, such as an age range, a gender, a spending level, etc. A leaf node defines a composite set of attributes. The customer persona 114 represents a path through the tree structure in the persona classifier model 112 and includes the attributes on the path from the root node to the leaf node Not all attributes may be represented in a particular leaf node. In some embodiments, the cluster labels 110 generated for the cluster model 109 during training are used as training labels for the large set of customer observations to train the persona classifier model 112.

An example segmentation rule for a leaf node is:

Profession_Healthcare<=0.0 and
Profession_Artist<=0.0 and
Graduated_Yes>0.0 and
Spending_Score_Low>0.0 and
Age<=81.5.

The resulting customer persona 114 associated with the leaf node is:

"Age is in range [18.00, 81.50] AND Graduated_Yes is True AND Profession_Artist is False AND Profession_ Healthcare is False AND Spending_Score _Low is True".

The customer persona 114 comprises ranges of values for a subset of the attributes in the attribute data 104.

Since each leaf node does not necessarily define segments for each attribute, the incoming customer may match the segment rule for multiple leaf nodes, and may thus have multiple candidate customer personas 114 based on the attribute data 104. In some embodiments, the persona generator 108 ranks candidate customer personas 114 based on a scoring function:

$$\text{Persona\_Score}=\text{Size\_Weight}*(\text{Persona\_Size}^i/\text{Total\_instance\_count})+\text{Diversity\_Weight}*(\text{Persona\_feature\_count}^i/\text{Total\_feature\_count}),$$

where

Size weight=weight based on the number of instances covered by the persona (number of observations from large data set).

Diversity Weight=weight based on diversity of attributes in the persona (number of attributes).

Persona size=total number of instances covered by the persona.

Total_Instance_count=total number of instances in the data.

Total_feature_count=total number of attributes in the data.

Persona_feature_count=number of attributes included in the persona.

In some embodiments, the persona generator 108 selects a customer persona 114 having the highest score for the incoming customer. Based on the identified customer persona 114 the persona generator 108 parses the content 106 to generate targeted content 116 for presenting the incoming customer. In some embodiments, the targeted content 116 includes content that was utilized by previous customers having the same customer persona 114. For example, where the targeted content comprises targeted information, information consumed by other customers may be prioritized for presentation to the current customer. For targeted service parameters, the service parameters for the current customer may be modified or the current customer may be offered an option to change a service plan based on patterns associated with other customers having the same customer persona 114. When location is considered as a customer attribute, the targeted service parameters may also be identified based on dynamic attributes of the RAN in that location.

FIG. 2 is a flow chart illustrating an example method 200 for training persona generation models, such as the cluster model 109 and the persona classifier model 112. At 202, the persona generator 108 receives an attribute data set. For example, the attribute data set may comprise the attribute data 104 for a large set of customers. At 204, the persona generator 108 cleans the attribute data set. In some embodiments, the persona generator 108 cleans the attribute data set using format rules to provide consistent attribute values across the records. At 206, the persona generator 108 defines the cluster model 109 using the attribute data set by identifying clusters of attributes and assigning labels to each cluster. At 208, the persona generator 108 generates the persona classifier model 112 using the cluster labels. In some embodiments, the persona generator 108 generates a decision tree with branches based on the attribute values and leaf nodes that segment the attributes to define the customer personas 114.

FIG. 3 is a flow chart illustrating an example method 300 for content targeting using a persona. At 302, the persona generator 108 receives incoming attribute data 104, such as the attributes of a customer contacting customer service, a customer browsing a web site, a customer entering a store, a customer accessing an on-line store, a customer entering an entertainment venue (stadium, theater, concert hall), a customer engaging in transportation (plane, train, bus, cab, ride share), or from a customer engaging in some other customer interaction. At 304, the persona generator 108 determines a cluster label 110 for the customer using the cluster model 109. At 306, the persona generator 108 determines candidate customer personas 114 using the persona classifier model 112. At 308, the persona generator 108 ranks the candidate customer personas 114, for example, based on a scoring function that considers the size and diversity of the candidate customer personas 114. At 310, the persona generator 108 selects one of the candidate customer personas 114, for example, the candidate customer persona 114 having the highest score. In some embodiments, the persona generator 108 selects multiple candidate customer personas 114. At 312, the candidate customer persona 114 provides targeted content 116 based on the selected customer persona(s) 114. The persona generator 108 may select content 106 from the database 102 that has been employed successfully by previous customers with the same customer persona 114 to generate the targeted content 116. The content may include targeted information and/or target service parameters for the customer. If multiple customer personas 114 are employed, the targeted content 116 may be sorted such that the targeted content 116 from the customer persona 114 with the highest score is provided first. In some embodiments, the customer personas 114 are linked to the content 106 based on customer behavioral patterns and web interaction data.

Figure 4:
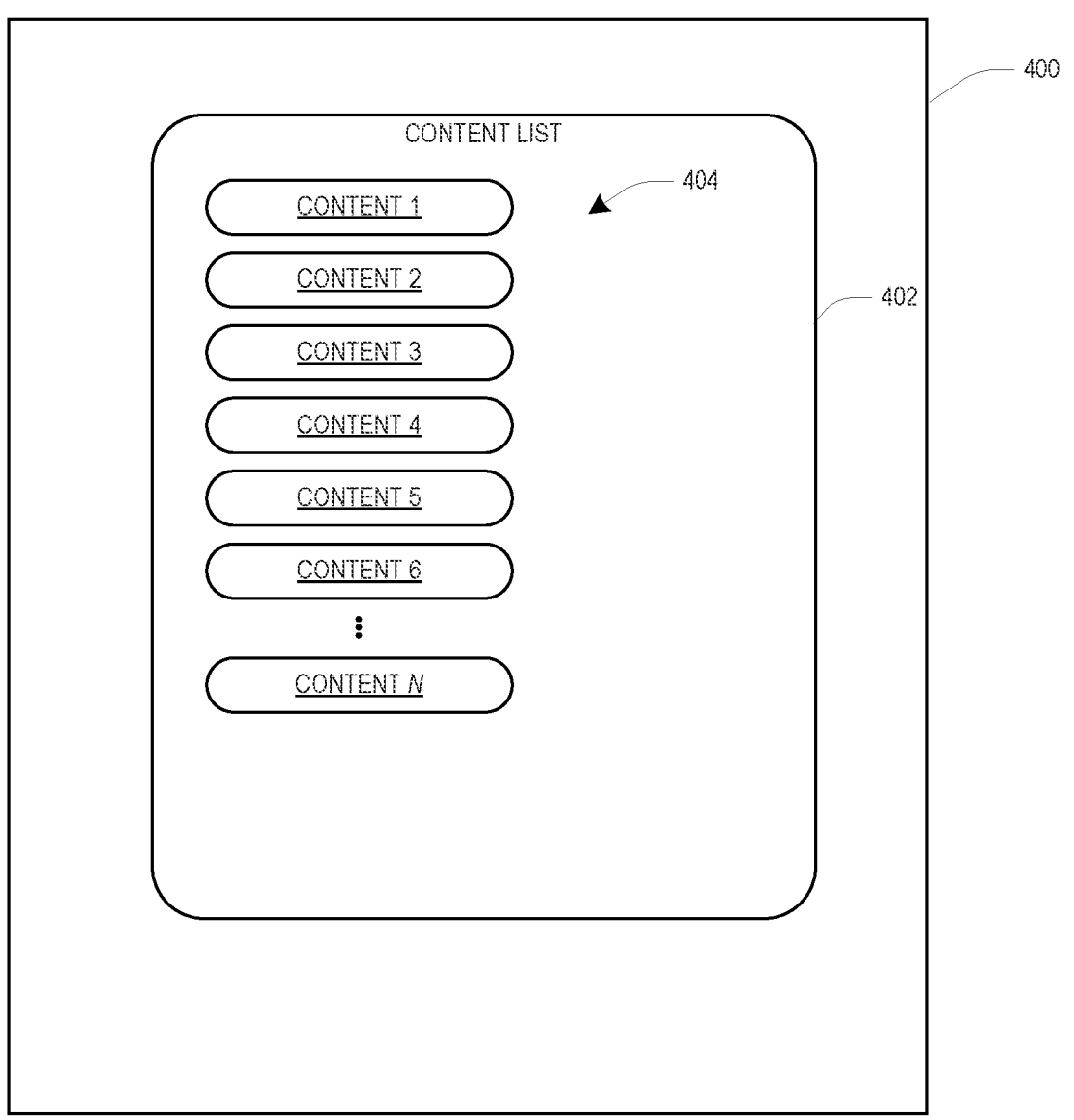
FIG. 4 is a diagram illustrating an example interface for displaying targeted content.

FIG. 4 is a diagram illustrating an example interface 400 for providing the targeted content 116. In some embodiments, the interface 400 comprises a display of a computing device, a smartphone, a tablet, a smartwatch, an augmented reality display, or some other suitable display device. A content list 402 is provided on the interface 400. In some embodiments, the content list 402 includes a set of targeted content items 404 generated based on the selected customer persona 114 or customer personas 114. The content list 402 may be ranked, such as by persona score or relevance based on previous customer interactions. In some embodiments, the interface 400 allows the user to select a targeted content item 404 to retrieve the associated content. In some embodiments, the content list 402 only includes the highest ranked targeted content items 404.

In some embodiments, the customer persona 114 is a compressed representation of the attribute data 104 for a customer. Using the customer persona 114 to generate the targeted content improves the operation of the computing system implementing the persona generator 108 since it reduces computational complexity. The compressed information represented by the customer persona 114 is used to provide the targeted content 116 rather than relying on processing the full attribute data 104 for the customer, thereby allowing the content personalization to be executed more quickly with less computing resource expenditure. Another advantage of the customer persona 114 is that the compressed information is still in human readable form, allowing model validation and fostering bias identification and mitigation in the content recommendation.

In an online example, the customer's attribute data 104 may include customer virtual reality demographic attributes, virtual reality behavioral patterns, and virtual avatar interaction data. The customer persona 114 represents a virtual presence persona and is compressed information about the user based on the user behavior pattern in the virtual world. A virtual presence customer persona 114 in the physical world.

In some embodiments, a customer persona 114 may relate to a digital journey of the customer created based on web site journey. For example, a provider may process data to understand homogeneous segments of customers who are dropping in the flow. A customer persona 114 related to a digital journey represents a homogeneous pattern of customer behavior that summarizes the journey start, path taken, journey end, and reason behind a drop. The customer persona 114 related to a digital journey may be used to identify revenue opportunities, perform website optimization, or implement marketing campaigns. In website optimization, the top homogeneous segments are studied to identify difficulties faced by customers in the flow and business actions are taken to simplify the complexities that hurdle the flow. Providing a reduced hurdle website journey increases the revenue opportunities lost by dropped customers. In some embodiments, the customer persona 114 provides segmented patterns ranked by persona score that can be used to provide opportunities/insights to take business action. Multiple homogeneous customer personas 114 are created from huge volumes of data in a shorter time compared to manual methods.

Figure 5:
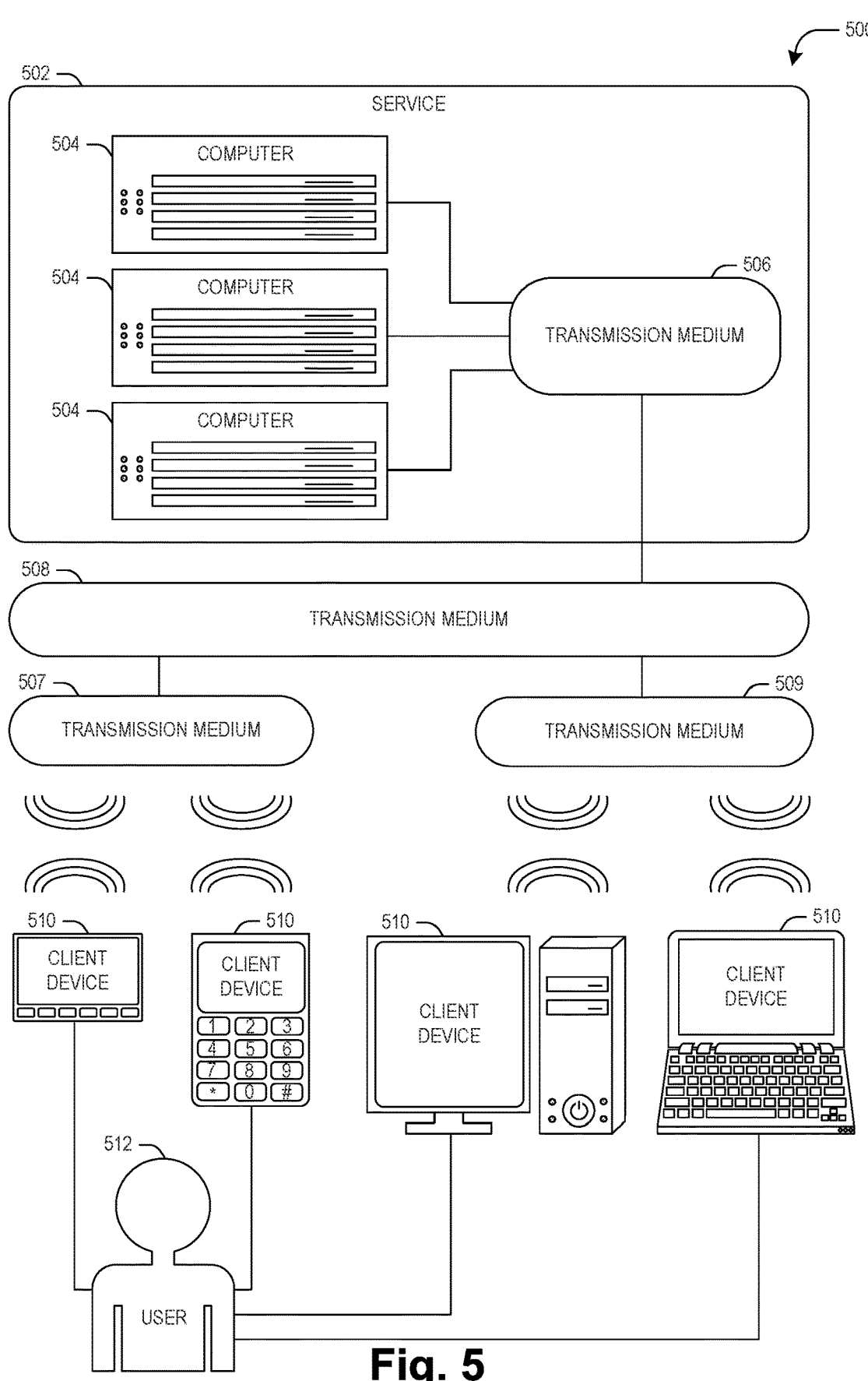
FIG. 5 is an illustration of a scenario involving various examples of transmission mediums that may be used to communicatively couple computers and clients.

FIG. 5 is an interaction diagram of a scenario 500 illustrating a service 502 provided by a set of computers 504 to a set of client devices 510 via various types of transmission mediums. The computers 504 and/or client devices 510 may be capable of transmitting, receiving, processing, and/or storing many types of signals, such as in memory as physical memory states.

The computers 504 of the service 502 may be communicatively coupled together, such as for exchange of communications using a transmission medium 506. The transmission medium 506 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 502.

Likewise, the transmission medium 506 may comprise one or more sub-networks, such as may employ different architectures, may be compliant or compatible with differing protocols and/or may interoperate within the transmission medium 506. Additionally, various types of transmission medium 506 may be interconnected (e.g., a router may provide a link between otherwise separate and independent transmission medium 506).

In scenario 500 of FIG. 5, the transmission medium 506 of the service 502 is connected to a transmission medium 508 that allows the service 502 to exchange data with other services 502 and/or client devices 510. The transmission medium 508 may encompass various combinations of devices with varying levels of distribution and exposure, such as a public wide-area network and/or a private network (e.g., a virtual private network (VPN) of a distributed enterprise).

In the scenario 500 of FIG. 5, the service 502 may be accessed via the transmission medium 508 by a user 512 of one or more client devices 510, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 510 may communicate with the service 502 via various communicative couplings to the transmission medium 508. As a first such example, one or more client devices 510 may comprise a cellular communicator and may communicate with the service 502 by connecting to the transmission medium 508 via a transmission medium 507 provided by a cellular provider. As a second such example, one or more client devices 510 may communicate with the service 502 by connecting to the transmission medium 508 via a transmission medium 509 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 504 and the client devices 510 may communicate over various types of transmission mediums.

Figures 6, 7:
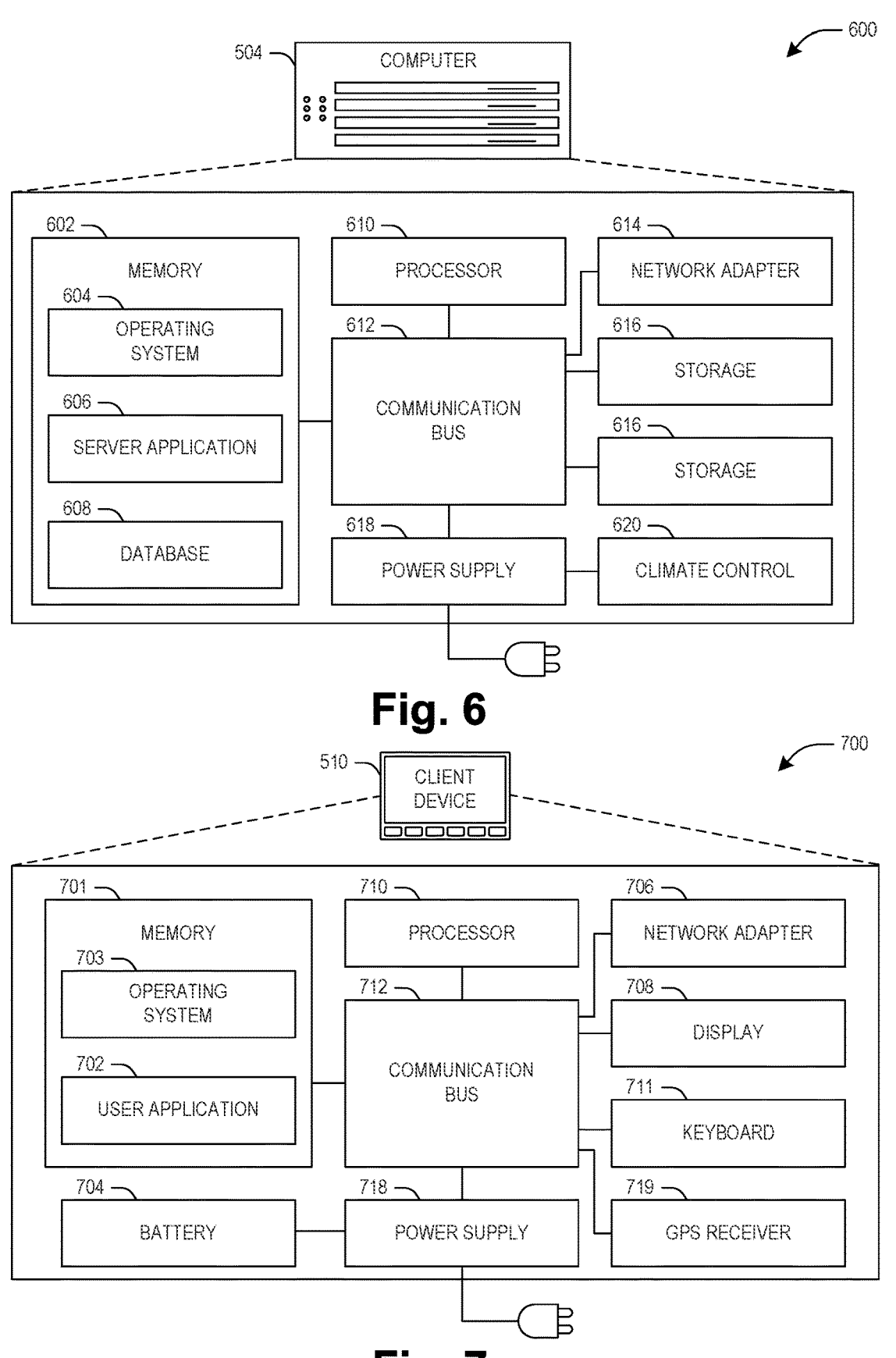
FIG. 6 is an illustration of a scenario involving an example configuration of a computer that may utilize and/or implement at least a portion of the techniques presented herein.
FIG. 7 is an illustration of a scenario involving an example configuration of a client that may utilize and/or implement at least a portion of the techniques presented herein.

FIG. 6 presents a schematic architecture diagram 600 of a computer 504 that may utilize at least a portion of the techniques provided herein. Such a computer 504 may vary widely in configuration or capabilities, alone or in conjunction with other computers, in order to provide a service such as the service 502.

The computer 504 may comprise one or more processors 610 that process instructions. The one or more processors 610 may optionally include a plurality of cores; one or more coprocessors, such as a mathematics coprocessor or an integrated graphical processing unit (GPU); and/or one or more layers of local cache memory. The computer 504 may comprise memory 602 storing various forms of applications, such as an operating system 604; one or more computer applications 606; and/or various forms of data, such as a database 608 or a file system. The computer 504 may comprise a variety of peripheral components, such as a wired and/or wireless network adapter 614 connectible to a local area network and/or wide area network; one or more storage components 616, such as a hard disk drive, a solid-state storage device (SSD), a flash memory device, and/or a magnetic and/or optical disk reader.

The computer 504 may comprise a mainboard featuring one or more communication buses 612 that interconnect the processor 610, the memory 602, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 612 may interconnect the computer 504 with at least one other computer. Other components that may optionally be included with the computer 504 (though not shown in the schematic architecture diagram 600 of FIG. 6) include a display; a display adapter, such as a graphical processing unit (GPU); input peripherals, such as a keyboard and/or mouse; and a flash memory device that may store a basic input/output system (BIOS) routine that facilitates booting the computer 504 to a state of readiness.

The computer 504 may operate in various physical enclosures, such as a desktop or tower, and/or may be integrated with a display as an "all-in-one" device. The computer 504 may be mounted horizontally and/or in a cabinet or rack, and/or may simply comprise an interconnected set of components. The computer 504 may comprise a dedicated and/or shared power supply 618 that supplies and/or regulates power for the other components. The computer 504 may provide power to and/or receive power from another computer and/or other devices. The computer 504 may comprise a shared and/or dedicated climate control unit 620 that regulates climate properties, such as temperature, humidity, and/or airflow. Many such computers 604 may be configured and/or adapted to utilize at least a portion of the techniques presented herein.

FIG. 7 presents a schematic architecture diagram 700 of a client device 510 whereupon at least a portion of the techniques presented herein may be implemented. Such a client device 510 may vary widely in configuration or capabilities, in order to provide a variety of functionality to a user such as the user 512. The client device 510 may be provided in a variety of form factors, such as a desktop or tower workstation; an "all-in-one" device integrated with a display 708; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 510 may serve the user in a variety of roles, such as a workstation, kiosk, media player, gaming device, and/or appliance.

The client device 510 may comprise one or more processors 710 that process instructions. The one or more processors 710 may optionally include a plurality of cores; one or more coprocessors, such as a mathematics coprocessor or an integrated graphical processing unit (GPU); and/or one or more layers of local cache memory. The client device 510 may comprise memory 701 storing various forms of applications, such as an operating system 703; one or more user applications 702, such as document applications, media applications, file and/or data access applications, communication applications such as web browsers and/or email clients, utilities, and/or games; and/or drivers for various peripherals. The client device 510 may comprise a variety of peripheral components, such as a wired and/or wireless network adapter 706 connectible to a local area network and/or wide area network; one or more output components, such as a display 708 coupled with a display adapter (optionally including a graphical processing unit (GPU)), a sound adapter coupled with a speaker, and/or a printer; input devices for receiving input from the user, such as a keyboard 711, a mouse, a microphone, a camera, and/or a touch-sensitive component of the display 708; and/or environmental sensors, such as a global positioning system (GPS) receiver 719 that detects the location, velocity, and/or acceleration of the client device 510, a compass, accelerometer, and/or gyroscope that detects a physical orientation of the client device 510. Other components that may optionally be included with the client device 510 (though not shown in the schematic architecture diagram 700 of FIG. 7) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 510 to a state of readiness; and a climate control unit that regulates climate properties, such as temperature, humidity, and airflow.

The client device 510 may comprise a mainboard featuring one or more communication buses 712 that interconnect the processor 710, the memory 701, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 510 may comprise a dedicated and/or shared power supply 718 that supplies and/or regulates power for other components, and/or a battery 704 that stores power for use while the client device 510 is not connected to a power source via the power supply 718. The client device 510 may provide power to and/or receive power from other client devices.

Figure 8:
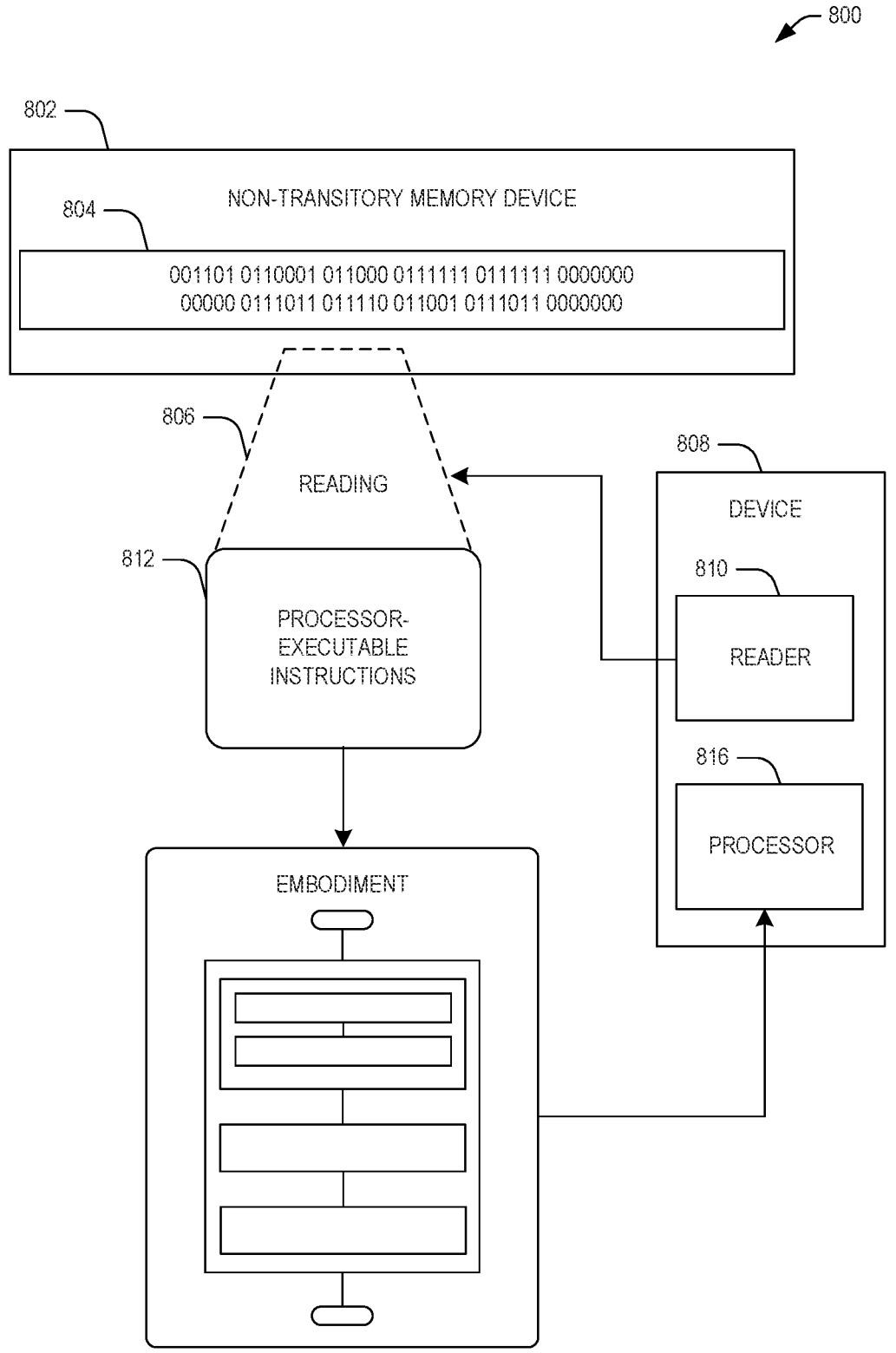
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random dom access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed cause performance of operations, such as at least some of the example method 200 of FIG. 2, for example. In some embodiments, the processor-executable instructions 812 are configured to cause implementation of a system, such as at least some of the example system 101 of FIG. 1, for example.

Figure 9:
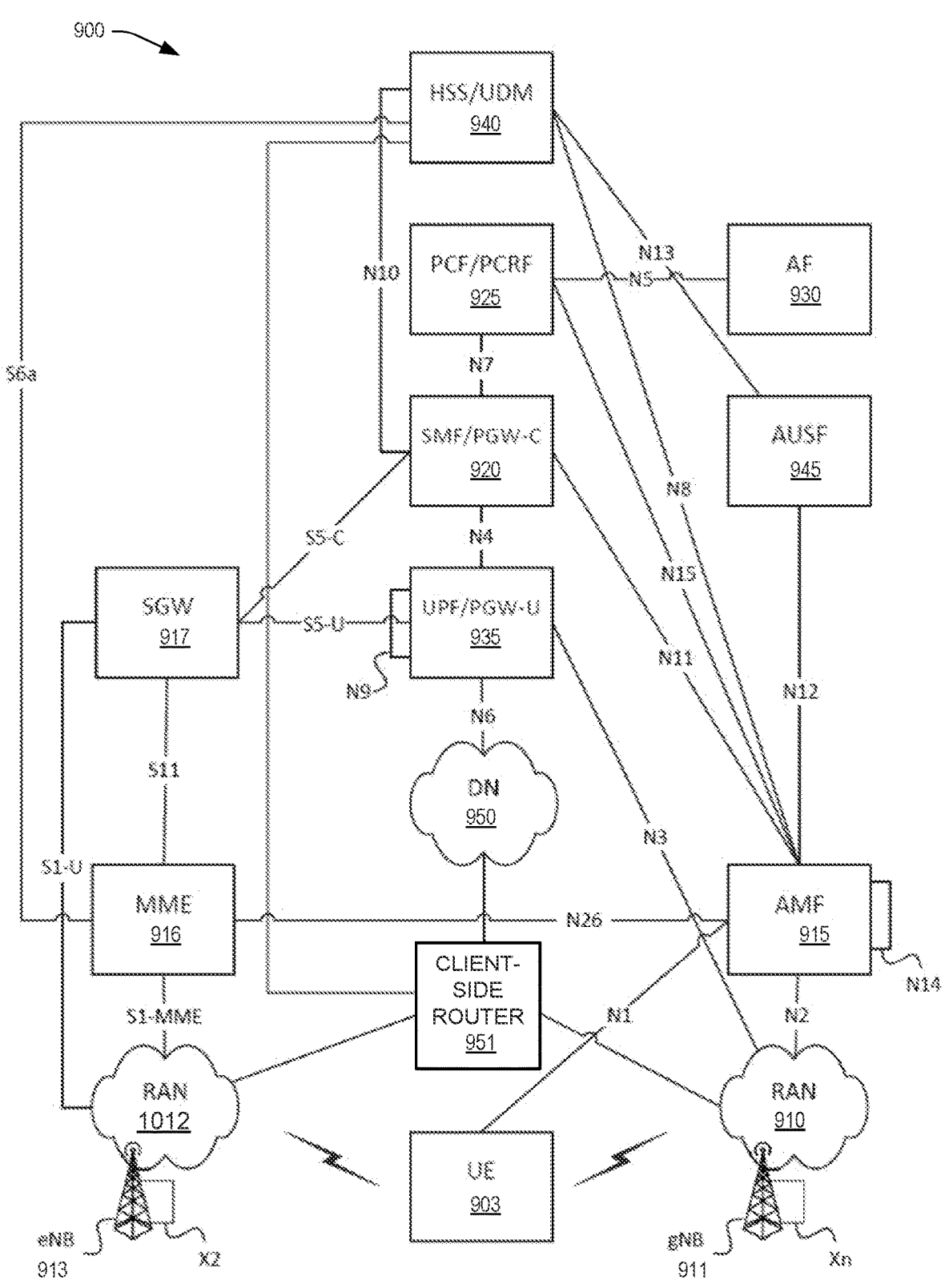
FIG. 9 is an illustration of an example environment in which at least a portion of the techniques presented herein may be utilized and/or implemented.

FIG. 9 illustrates an example environment 900, in which one or more embodiments may be implemented. In some embodiments, environment 900 may correspond to a Fifth Generation ("5G") network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 900 may include UE 903, RAN 910 (which may include one or more Next Generation Node Bs ("gNBs") 911), RAN 912 (which may include one or more one or more evolved Node Bs ("eNBs") 913), and various network functions such as Access and Mobility Management Function ("AMF") 915, Mobility Management Entity ("MME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Home Subscriber Server ("HSS")/Unified Data Management ("UDM") 940, and Authentication Server Function ("AUSF") 945. Environment 900 may also include one or more networks, such as Data Network ("DN") 950. Environment 900 may include one or more additional devices or systems communicatively coupled to one or more networks (e.g., DN 950), such as client-side router 951.

The example shown in FIG. 9 illustrates one instance of each network component or function (e.g., one instance of SMF/PGW-C 920, PCF/PCRF 925, UPF/PGW-U 935, HSS/UDM 940, and/or 945). In practice, environment 900 may include multiple instances of such components or functions. For example, in some embodiments, environment 900 may include multiple "slices" of a core network, where each slice includes a discrete set of network functions (e.g., one slice may include a first instance of SMF/PGW-C 920, PCF/PCRF 925, UPF/PGW-U 935, HSS/UDM 940, and/or 945, while another slice may include a second instance of SMF/PGW-C 920, PCF/PCRF 925, UPF/PGW-U 935, HSS/UDM 940, and/or 945). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively and/or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 903 may include a computation and communication device, such as a wireless mobile communication device that is capable of communicating with RAN 910, RAN 912, and/or DN 950. UE 903 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 903 may send traffic to and/or receive traffic (e.g., user plane traffic) from DN 950 via RAN 910, RAN 912, and/or UPF/PGW-U 935.

RAN 910 may be, or may include, a 5G RAN that includes one or more base stations (e.g., one or more gNBs 911), via which UE 903 may communicate with one or more other elements of environment 900. UE 903 may communicate with RAN 910 via an air interface (e.g., as provided by gNB 911). For instance, RAN 910 may receive traffic (e.g., voice call traffic, data traffic, messaging traffic, signaling traffic, etc.) from UE 903 via the air interface, and may communicate the traffic to UPF/PGW-U 935, and/or one or more other devices or networks. Similarly, RAN 910 may receive traffic intended for UE 903 (e.g., from UPF/PGW-U 935, AMF 915, and/or one or more other devices or networks) and may communicate the traffic to UE 903 via the air interface.

RAN 912 may be, or may include, a LTE RAN that includes one or more base stations (e.g., one or more eNBs 913), via which UE 903 may communicate with one or more other elements of environment 900. UE 903 may communicate with RAN 912 via an air interface (e.g., as provided by eNB 913). For instance, RAN 910 may receive traffic (e.g., voice call traffic, data traffic, messaging traffic, signaling traffic, etc.) from UE 903 via the air interface, and may communicate the traffic to UPF/PGW-U 935, and/or one or more other devices or networks. Similarly, RAN 910 may receive traffic intended for UE 903 (e.g., from UPF/PGW-U 935, SGW 917, and/or one or more other devices or networks) and may communicate the traffic to UE 903 via the air interface.

AMF 915 may include one or more devices, systems, Virtualized Network Functions ("VNFs"), etc., that perform operations to register UE 903 with the 5G network, to establish bearer channels associated with a session with UE 903, to hand off UE 903 from the 5G network to another network, to hand off UE 903 from the other network to the 5G network, manage mobility of UE 903 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, etc., that perform operations to register UE 903 with the EPC, to establish bearer channels associated with a session with UE 903, to hand off UE 903 from the EPC to another network, to hand off UE 903 from another network to the EPC, manage mobility of UE 903 between RANs 912 and/or eNBs 913, and/or to perform other operations.

SGW 917 may include one or more devices, systems, VNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, etc., that gather, process, store, and/or provide information in a manner described herein. SMF/PGW-C 920 may, for example, facilitate in the establishment of communication sessions on behalf of UE 903. In some embodiments, the establishment of communications sessions may be performed in accordance with one or more policies provided by PCF/PCRF 925.

PCF/PCRF 925 may include one or more devices, systems, VNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, etc., that receive, store, and/or provide information that may be used in determining parameters (e.g., quality of service parameters, charging parameters, or the like) for certain applications.

UPF/PGW-U 935 may include one or more devices, systems, VNFs, etc., that receive, store, and/or provide data (e.g., user plane data). For example, UPF/PGW-U 935 may receive user plane data (e.g., voice call traffic, data traffic, etc.), destined for UE 903, from DN 950, and may forward the user plane data toward UE 903 (e.g., via RAN 910, SMF/PGW-C 920, and/or one or more other devices). In some embodiments, multiple UPFs 935 may be deployed (e.g., in different geographical locations), and the delivery of content to UE 903 may be coordinated via the N9 interface (e.g., as denoted in FIG. 9 by the line marked "N9" originating and terminating at UPF/PGW-U 935). Similarly, UPF/PGW-U 935 may receive traffic from UE 903 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

HSS/UDM 940 and AUSF 945 may include one or more devices, systems, VNFs, etc., that manage, update, and/or store, in one or more memory devices associated with AUSF 945 and/or HSS/UDM 940, profile information associated with a subscriber. AUSF 945 and/or HSS/UDM 940 may perform authentication, authorization, and/or accounting operations associated with the subscriber and/or a communication session with UE 903.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 903 may communicate, through DN 950, with data servers, other UEs UE 903, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 903 may communicate.

The client-side router 951 may include one or more devices, systems, VNFs, etc., that perform one or more operations described herein. For example, the client-side router 951 may monitor and/or analyze video stream chunks and/or statuses associated with video stream chunks to check for quality issues and/or may deliver video stream chunks to UE 903.

FIG. 11 illustrates an example Distributed Unit ("DU") network 1100, which may be included in and/or implemented by one or more RANs (e.g., RAN 1010, RAN 1012, or some other RAN). In some embodiments, a particular RAN may include one DU network 1000. In some embodiments, a particular RAN may include multiple DU networks 1000. In some embodiments, DU network 1000 may correspond to a particular gNB 1011 of a 5G RAN (e.g., RAN 1010). In some embodiments, DU network 1000 may correspond to multiple gNBs 1011. In some embodiments, DU network 1000 may correspond to one or more other types of base stations of one or more other types of RANs. As shown, DU network 1000 may include Central Unit ("CU") 1005, one or more Distributed Units ("DUs") 1003-1 through

1003-N (referred to individually as "DU 1003," or collectively as "DUs 1003"), and one or more Radio Units ("RUs") 1001-1 through 1001-M (referred to individually as "RU 1001," or collectively as "RUs 1001").

Figure 10:
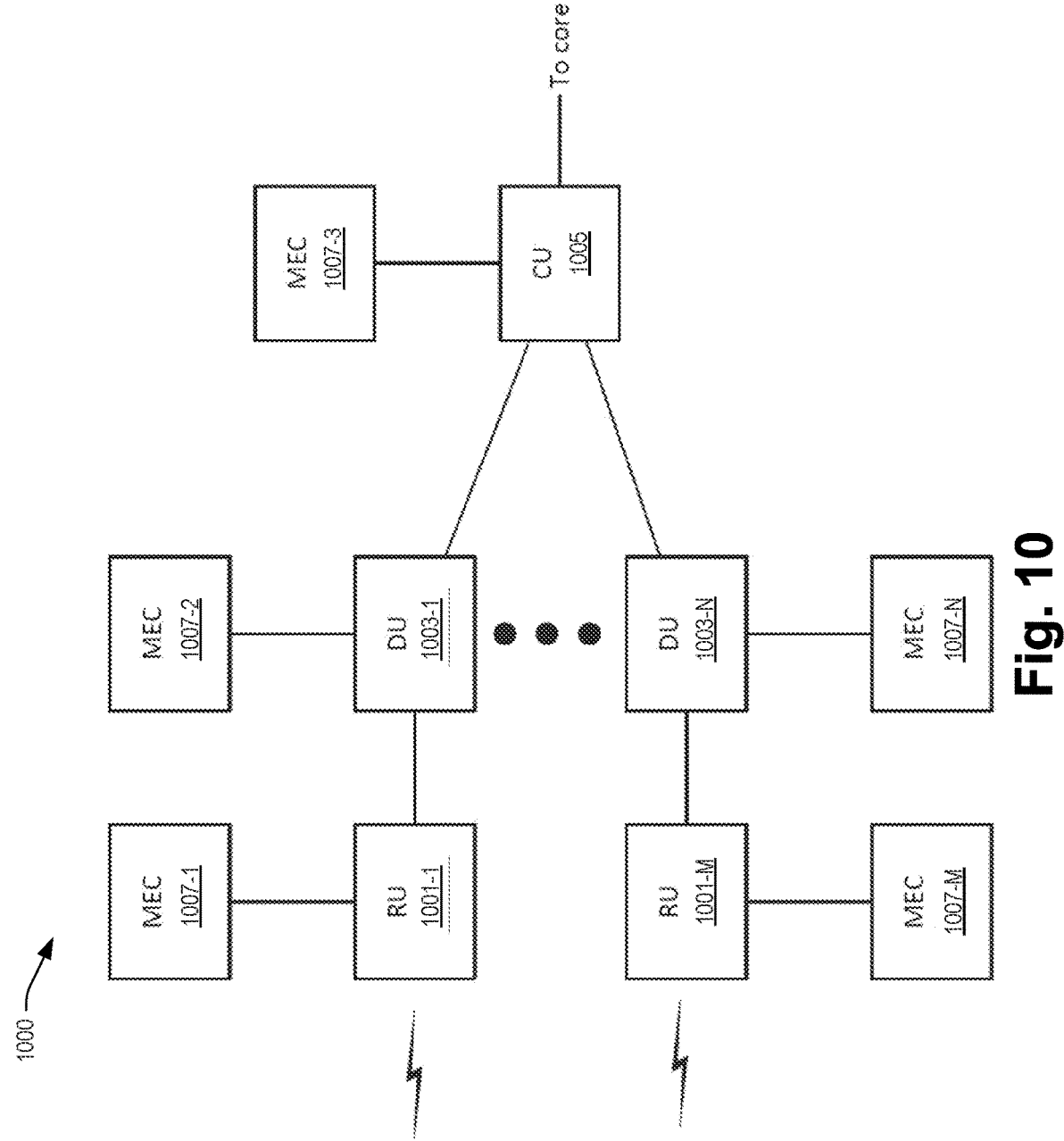
FIG. 10 is an illustration of an example network that may utilize and/or implement at least a portion of the techniques presented herein.

CU 1005 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs 903 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 903, and may determine which DU(s) 1003 should receive the downlink traffic. DU 1003 may include one or more devices that transmit traffic between a core network (e.g., via CU 1005) and UE 903 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 903.

RU 1001 may include hardware circuitry (e.g., one or more RF transceivers, antennas, radios, and/or other suitable hardware) to communicate wirelessly (e.g., via an RF interface) with one or more UEs 903, one or more other DUs 1003 (e.g., via RUs 1001 associated with DUs 1003), and/or any other suitable type of device. In the uplink direction, RU 1001 may receive traffic from UE 903 and/or another DU 1003 via the RF interface and may provide the traffic to DU 1003. In the downlink direction, RU 1001 may receive traffic from DU 1003, and may provide the traffic to UE 903 and/or another DU 1003.

RUs 1001 may, in some embodiments, be communicatively coupled to one or more Multi-Access/Mobile Edge Computing ("MEC") devices, referred to sometimes herein simply as ("MECs") 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from UE 903, via a respective RU 1001.

For example, RU 1001-1 may route some traffic, from UE 903, to MEC 1007-1 instead of to a core network (e.g., via DU 1003 and CU 1005). MEC 1007-1 may process the traffic, perform one or more computations based on the received traffic, and may provide traffic to UE 903 via RU 1001-1. In this manner, ultra-low latency services may be provided to UE 903, as traffic does not need to traverse DU 1003, CU 1005, and an intervening backhaul network between DU network 1000 and the core network. In some embodiments, MEC 1007 may include, and/or may implement some or all of the functionality described above with respect to the client-side router 1051 and/or at least one cache node of the cache.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   receiving, by a device, attribute data for a customer, wherein the attribute data comprises location data for the customer;
   determining, by the device, a cluster label for the customer based on the attribute data;
   determining, by the device and for the customer, a first customer persona shared by one or more other customers using a decision tree classifier model based on the cluster label and the attribute data;
   dynamically correlating the location data for the customer to one or more attributes of a radio access network (RAN) associated with a location of the customer;
   determining, by the device, one or more targeted service parameters associated with a network for the customer based on the first customer persona and the one or more attributes of the RAN in the location of the customer; and
   providing, by the device, the one or more targeted service parameters to a second device associated with the customer, wherein the one or more targeted service parameters are configured to cause the second device to modify one or more service parameters, associated with existing hardware, for the customer.

2. The method of claim 1, wherein:
   the one or more attributes of the RAN used to determine the one or more targeted service parameters comprise at least one of a signal strength of the RAN or a sector count of the RAN.

3. The method of claim 1, wherein:
   the one or more attributes of the RAN used to determine the one or more targeted service parameters comprise at least one of utilization of the RAN or congestion of the RAN.

4. The method of claim 1, wherein:
   determining, by the device, the cluster label comprises determining the cluster label using a k-means cluster model.

5. The method of claim 1, wherein:
the one or more targeted service parameters associated with the network correspond to at least one of bandwidth, priority, network type or coverage plan.

6. The method of claim 1, wherein:
determining, by the device, the first customer persona comprises identifying, by the device, a first candidate customer persona and a second candidate customer persona;
determining, by the device, a first score for the first candidate customer persona and a second score for the second candidate customer persona; and
selecting, by the device, the first candidate customer persona as the first customer persona responsive to the first score being greater than the second score.

7. The method of claim 6, wherein:
determining, by the device, the first score comprises determining the first score based on a diversity parameter associated with the first candidate customer persona.

8. The method of claim 6, wherein:
determining, by the device, the first score comprises determining the first score based on a size parameter associated with the first candidate customer persona.

9. The method of claim 6, comprising:
selecting, by the device, a second customer persona from the first candidate customer persona and the second candidate customer persona;
providing, by the device, targeted content based on the first customer persona and the second customer persona; and
sorting, by the device, the targeted content based on the first score and the second score such that a portion of the targeted content associated with the first customer persona is provided prior to a second portion of the targeted content associated with the second customer persona responsive to the first score being greater than the second score.

10. A system comprising:
a processor configured to execute instructions to facilitate performance of operations comprising:
receiving attribute data for a customer, wherein the attribute data comprises location data for the customer;
determining a cluster label for the customer based on the attribute data;
determining, for the customer, a first customer persona shared by one or more other customers using a decision tree classifier model based on the cluster label and the attribute data;
dynamically correlating the location data for the customer to one or more attributes of a radio access network (RAN) associated with a location of the customer;
determining one or more targeted service parameters associated with a network for the customer based on the first customer persona and the one or more attributes of the RAN in the location of the customer; and
providing the one or more targeted service parameters to a device associated with the customer, wherein the one or more targeted service parameters are configured to cause the device to modify one or more service parameters for the customer.

11. The system of claim 10, wherein:
the first customer persona comprises a first range of values for a first attribute of the attribute data and a second range of values for a second attribute of the attribute data.

12. The system of claim 10, wherein:
the operations comprise determining the cluster label using a cluster model.

13. The system of claim 12, wherein:
the operations comprise determining the cluster label using a k-means cluster model.

14. The system of claim 10, wherein:
the one or more targeted service parameters associated with the network correspond to at least one of bandwidth, priority, network type or coverage plan.

15. The system of claim 10, wherein:
the operations comprise:
determining the first customer persona by identifying a first candidate customer persona and a second candidate customer persona;
determining a first score for the first candidate customer persona and a second score for the second candidate customer persona; and
selecting the first candidate customer persona as the first customer persona responsive to the first score being greater than the second score.

16. The system of claim 15, wherein:
the operations comprise determining the first score based on a diversity parameter associated with the first candidate customer persona.

17. The system of claim 15 wherein:
the operations comprise determining the first score based on a size parameter associated with the first candidate customer persona.

18. The system of claim 15, wherein the operations comprise:
selecting a second customer persona from the first candidate customer persona and the second candidate customer persona;
providing targeted content based on the first customer persona and the second customer persona; and
sorting the targeted content based on the first score of the first customer persona and the second score of the second customer persona such that a portion of the targeted content associated with the first customer persona is provided prior to a second portion of the targeted content associated with the second customer persona responsive to the first score being greater than the second score.

19. A non-transitory computer-readable medium storing instructions that when executed facilitate performance of operations comprising:
receiving attribute data for a customer, wherein the attribute data comprises location data for the customer;
determining a cluster label for the customer based on the attribute data;
determining, for the customer, a first customer persona shared by one or more other customers using a decision tree classifier model based on the cluster label and the attribute data;
dynamically correlating the location data for the customer to one or more attributes of a radio access network (RAN) associated with a location of the customer;
determining one or more targeted service parameters associated with a network for the customer based on the first customer persona and the one or more attributes of the RAN in the location of the customer; and using the one or more targeted service parameters to
modify one or more service parameters associated with
existing hardware of a device associated with the
customer.

20. The non-transitory computer-readable medium of
claim 19, wherein the operations comprise:
determining the first customer persona by identifying a
first candidate customer persona and a second candi-
date customer persona;
determining a first score for the first candidate customer
persona and a second score for the second candidate
customer persona; and
selecting the first candidate customer persona as the first
customer persona responsive to the first score being
greater than the second score.

\* \* \* \* \*